United States Patent [19]

Thompson

[11] 4,285,637
[45] Aug. 25, 1981

[54] PROPELLER ASSEMBLY

[76] Inventor: Richard R. Thompson, 336 Fitzwater St., Philadelphia, Pa. 19147

[21] Appl. No.: 27,483

[22] Filed: Apr. 5, 1979

[51] Int. Cl.³ .................... B64C 11/06; F04D 29/36
[52] U.S. Cl. .................................. 416/202; 416/208; 416/89
[58] Field of Search .............. 416/89, 61, 202, 208, 416/207, 214 R, 244 R

[56] References Cited

U.S. PATENT DOCUMENTS

| | | | |
|---|---|---|---|
| 1,022,846 | 4/1912 | Irving | 416/89 |
| 1,154,649 | 9/1915 | Miller | 416/202 |
| 1,648,837 | 11/1927 | Anderson | 416/202 X |
| 1,857,678 | 5/1932 | Sukohl | 416/208 |
| 2,096,860 | 10/1937 | Renquist et al. | 416/89 A |
| 2,637,720 | 4/1953 | Forrest | 416/208 |
| 3,275,198 | 9/1966 | Barlow | 416/202 X |
| 3,545,884 | 12/1970 | Schroeter et al. | 416/207 X |

FOREIGN PATENT DOCUMENTS

| | | | |
|---|---|---|---|
| 304446 | 3/1918 | Fed. Rep. of Germany | 416/89 |
| 998541 | 1/1952 | France | 416/202 |

Primary Examiner—Everette A. Powell, Jr.

[57] ABSTRACT

A propeller assembly is provided in which the propeller blades are adjustable both rotatably and longitudinally. Pitch angle of the propeller blades may be adjusted by rotating the blades in the hub of the assembly. The outer diameter of the propeller blades may be adjusted by sliding the shafts of the blades into the hub of the assembly to a desired position and locking the shafts thereat by means of set collars. The hub of this propeller assembly is split providing for disassembly and removal of the entire propeller assembly from the drive shaft without removing inboard or outboard shaft bearings or other components. The entire assembly is specially designed for simplified construction by the average amateur homebuilder or hobbyist using only a hack saw, drill press and grinder. No casting, welding or machining is necessary.

17 Claims, 8 Drawing Figures

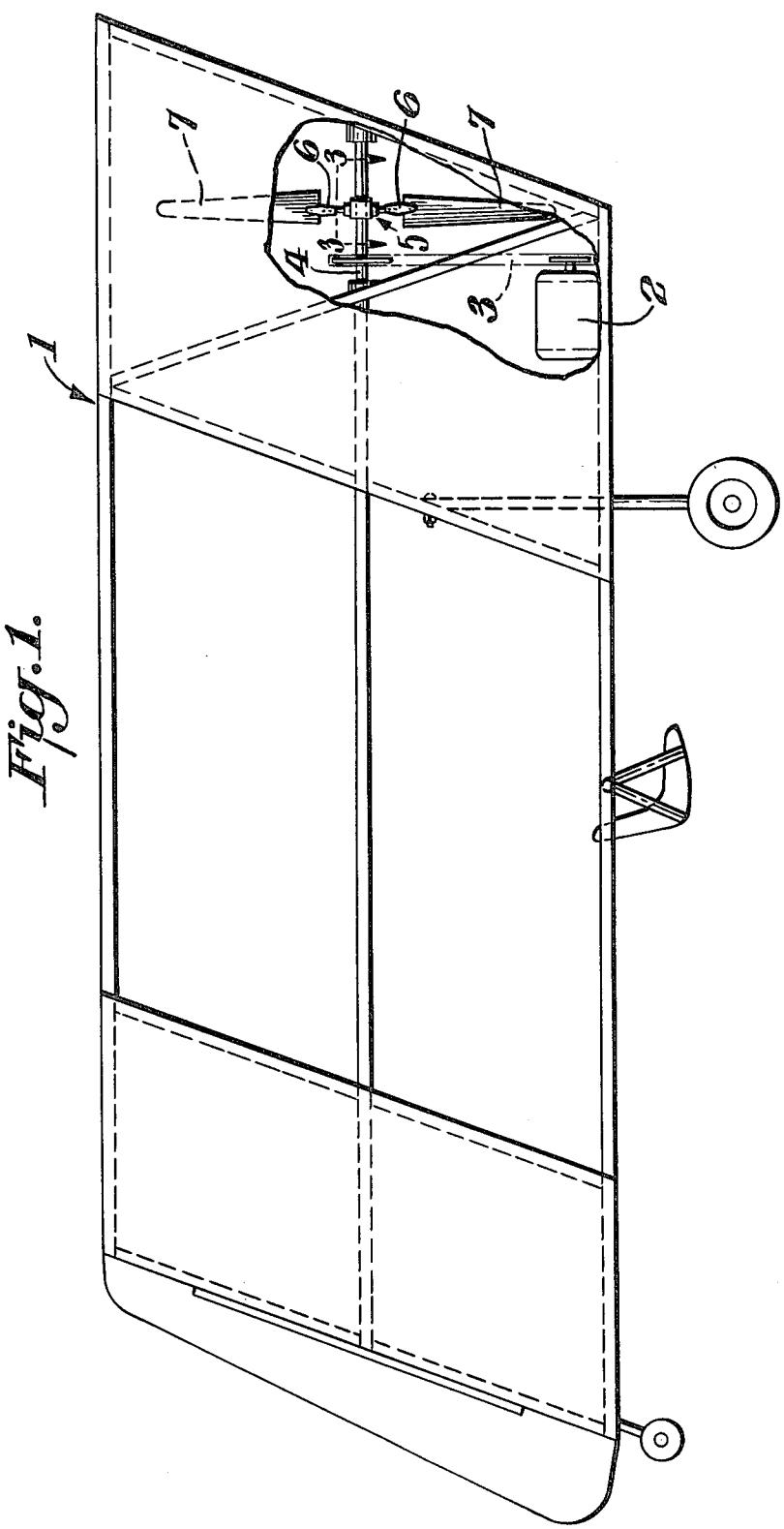

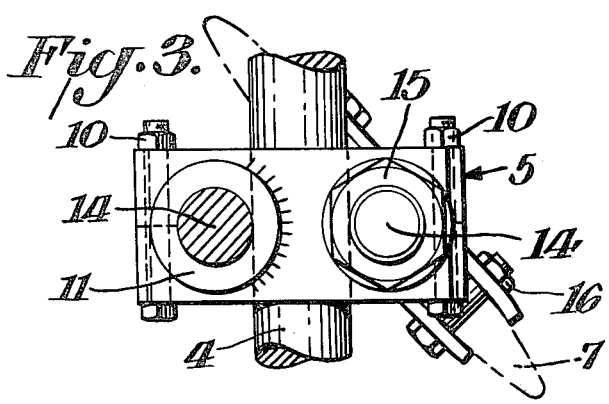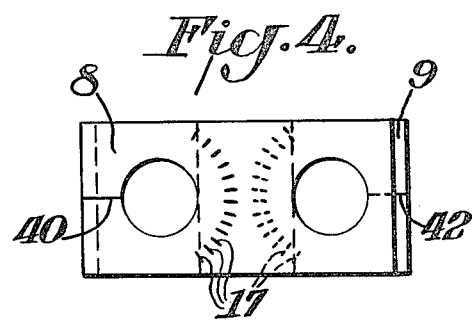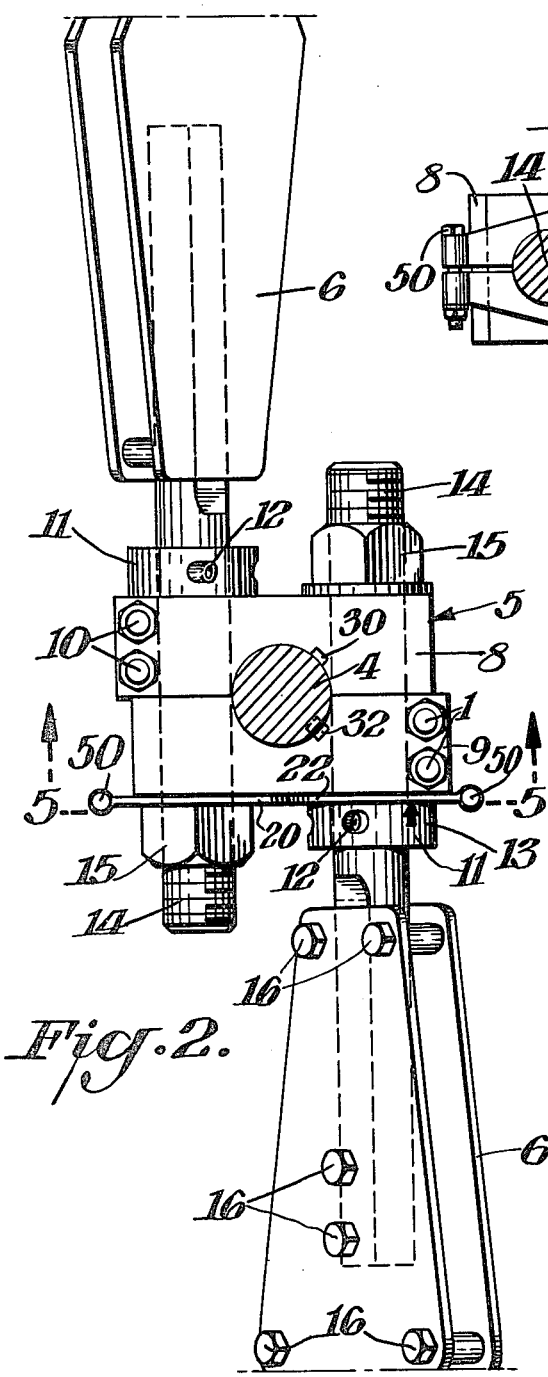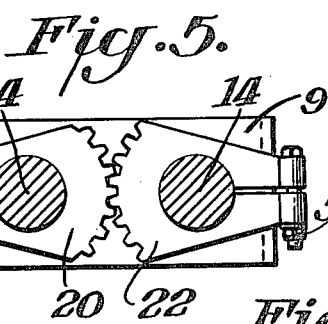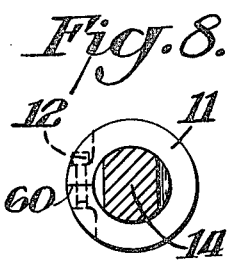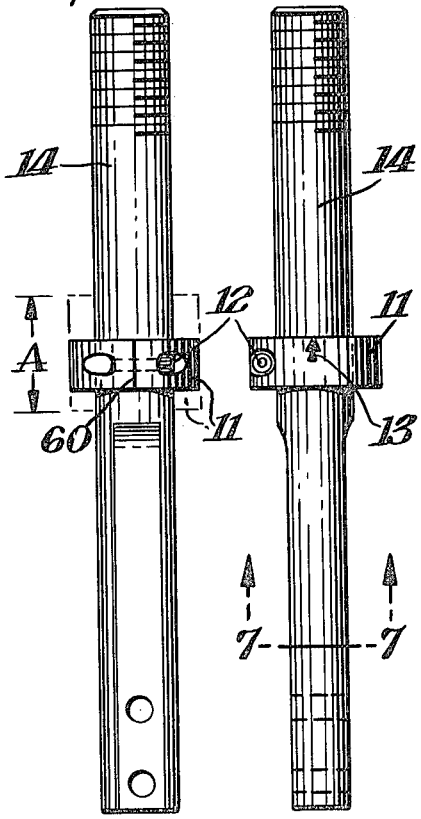

PROPELLER ASSEMBLY

BACKGROUND OF THE INVENTION

This invention relates to a new propeller assembly. The assembly is especially suited for lightweight, low airspeed aircraft such as that disclosed in my prior U.S. Pat. No. 3,930,624, but the assembly may be utilized in any propeller system in which the unique features of this invention provide an advantage.

In U.S. Pat. No. 3,930,624, issued Jan. 6, 1976, there is described a lightweight aircraft having a major longitudinal strength structure generally centralized in the vertical mid-plane. Shallow V-shaped wing panels are secured to this longitudinal strength structure, one at the top and one at the bottom, to define a rhombic, cellular wing configuration, viewed axially of the craft. Paired, positive-lift rhombic wings are disposed toward the ends of the aircraft and cooperate with a substantially triangulated aircraft frame.

The aircraft described in the aforesaid patent is exceptionally compact, possesses light weight with strength, light wing-loading, low landing speed, stability, safety, simplicity, ease of inspection, field adjustment and repair, and facility of control operation of the aircraft, all at moderate cost.

The thrust producing system of the aircraft depicted in U.S. Pat. No. 3,930,624 comprises a propeller mounted on a drive shaft extending between bearings located in the upwardly diverging central vertical braces of the aircraft wing assembly. The center of thrust of the propeller is substantially on the longitudinal axis of the fore and aft wings, near the center of drag of the aircraft. The propeller is driven by an engine (preferably two) connected by a chain or belt to the propeller drive shaft.

U.S. Pat. No. 1,154,649, issued Sept. 28, 1915, depicts a propeller in which the blades are adjustable to any desired pitch, which includes a propeller hub assembly in which the propeller blades are rotatably mounted and including means to hold the blades in their adjusted positions. This patent further provides a propeller in which the separate blades may be adjusted in exact relation with each other so that both of the blades will have the same pitch. The simplified design requires only drilling and cutting for manufacture.

U.S. Pat. No. 1,949,611, issued Mar. 6, 1934, depicts a propeller assembly in which the major portion of each blade is offset from the center line of the root of the blade whereby, during changing of the pitch angle of the blade, an actual raising and lowering movement of the blade tip is effected so that the desired pitch angle will be obtained throughout the length of the blade and permitting the blade to follow a geometrical helix during rotation.

U.S. Pat. No. 1,648,837, issued Nov. 8, 1927, provides a wind driven power plant in which propeller blades are driven under the control of governors which automatically regulate the pitch of the blades or vanes to provide even speed of the drive shaft operated by the blades regardless of wind speed. The propeller assembly, depicted in this patent is one in which the individual propeller blades are mounted in a hub and are offset from a common centerline, similar to the blade assembly depicted in the aforesaid U.S. Pat. No. 1,154,649.

None of these prior patents describe a propeller assembly in which the propeller blades are adjustable longitudinally along their axes, i.e. the span of the blades is adjustable, by adjusting the propeller shafts in the hub of the assembly to a desired position and locking the shafts thereat by means of set collars. In addition, none of these prior patents disclose a hub for a propeller assembly which is split transversely providing for disassembly and removal of the entire propeller assembly from the drive shaft without removing inboard or outboard shaft bearings or any other components. Such a propeller assembly is the subject of this invention.

BRIEF DESCRIPTION OF THE DRAWINGS

In the drawings, FIG. 1 is a side elevational view of the aircraft depicted in U.S. Pat. No. 3,930,624, incorporating the propeller assembly of this invention generally shown in the cutaway.

FIG. 2 shows a detailed side elevational view of the propeller assembly of this invention, including hub, drive shaft, propeller blade root plates and stub shafts, and sector gears which simultaneously adjust pitch of both blades. The propeller blades themselves are omitted for clarity.

FIG. 3 is a top sectional view of the propeller assembly taken along line 3—3 of FIG. 1.

FIG. 4 is a top plan view of the split hub of this invention showing degrees of pitch marked thereon.

FIG. 5 is a plan view of the split hub and adjustable sector gears of this invention taken along the line 5—5 of FIG. 2.

FIG. 6 is a front view of the propeller shaft and collar showing the longitudinal adjustability of the collar on the shaft indicated by the double arrows designated "A".

FIG. 7 is a side view of the propeller shaft and collar showing the indicating arrow thereon which facilitates pitch adjustment by alignment of the indicating arrow with a desired degree of pitch mark on the split hub.

FIG. 8 is a sectional view of the propeller shaft taken along the line 7—7 of FIG. 7.

SUMMARY OF THE INVENTION

A propeller assembly is provided comprising a hub adapted to be attached to an axial drive shaft and having longitudinal bores therethrough, propeller blades oppositely disposed in the longitudinal direction mounted on propeller shafts insertible into the bores and rotatable therein, and means for holding the blades at any rotatably adjusted position in the bores, wherein the hub is comprised of two hub halves forming the full hub about the drive shaft when the halves are joined together, the hub thus formed being split in the transverse direction, and means for joining the hub halves together about the drive shaft.

Also provided are means on the propeller blade shafts for adjusting the longitudinal distance into the bores to which the shafts are inserted, and means such as set collars for holding the shafts at any longitudinal position in the bores.

A scale of degrees of rotation can be marked on the hub about each propeller shaft and an indexing mark can be placed on each said collar, thereby providing means for precisely adjusting degree of blade pitch.

DETAILED DESCRIPTION OF THE INVENTION WITH REFERENCE TO THE DRAWINGS

The propeller assembly of this invention can best be described in detail by referring to the accompanying drawings.

FIG. 1 shows an overall side elevational view of the propeller assembly of this invention mounted in the aircraft of U.S. Pat. No. 3,930,624. The assembly is shown in the cutaway from the aircraft 1, wherein drive motor 2 drives shaft 4 through chain 3 and suitable sprockets. Mounted on drive shaft 4 is the propeller assembly of this invention, including hub 5, propeller blade root plates 6 and propeller blades 7.

FIG. 2 shows a detailed side elevational view of the propeller assembly wherein the propeller blades have been omitted for clarity of illustration. It is convenient for description purposes to define for later reference certain directions with respect to the assembly. By definition, therefore, the direction along the long axes of the propeller blades will be referred to as the longitudinal direction, and the direction along the axis of the drive shaft will be referred to as the axial direction. The orthogonal direction which is thus mutually perpendicular to both the longitudinal and axial directions will be termed the transverse direction.

Referring to FIG. 2, the component parts of the assembly include drive shaft 4 upon which hub halves 8 and 9 are mounted, bolts 10 which secure propeller blade stub shafts 14 into hub halves 8 and 9, longitudinally adjustable collars 11 having set screws 12 to fix collars 11 to shafts 14, propeller blade root plates 6 which hold the blades and are bolted to shafts 14 by bolts 16, and securing nuts 15 which, together with collars 11, secure the blade shafts 14 into the hub assembly. Also shown in FIG. 2 are keys 30 and 32 which prevent rotational slippage between the drive shaft and the hub, optional sector gears 20 and 22 which provide for simultaneous pitch adjustment of both propeller blades, and arrow indicators 13 on collars 11 which, together with the rotational degree marks on the hub, permit exact adjustment of pitch angles.

While still referring to FIG. 2, it will be seen that a key component in the propeller assembly of this invention is the split hub. This hub is formed by the two hub halves 8 and 9 which contain longitudinal bores through which propeller blade stub shafts 14 are inserted and secured by the set collars 11 and nuts 15, as shown. Each hub half 8 and 9 contains a semi-circular axial cutout such that, when the hub halves are joined to form the hub, the cutouts form an axial bore through which extends drive shaft 4. The hub thus clamps down snugly onto drive shaft 4 and is keyed thereto.

It will further be seen with reference to FIG. 2 that the propeller blades in the assembly of this invention are adjustable both rotatably in the bores of the hub and longitudinally. Thus, blade pitch may be adjusted by rotation of the blades. Also, propeller blade span, i.e. longitudinal distance between blade tips, can be adjusted by sliding the blade stub shafts 14 in the bores of the hub. The blades are fixed at the desired settings by means of axial bolts 10, set collars 11 together with collar set screws 12, and shaft nuts 15.

FIG. 3, in top section taken along line 3—3 of FIG. 1, shows the hub clamped upon drive shaft 4. Blade shafts 14 extend through the bores in the hub and blade 7 (shown in phantom) and shaft 14 are secured to the hub by nut 15. Blade 7 is shown bolted into root plate 6 by bolts 16. The upper blade is omitted for clarity. Set collar 11, when secured to the desired longitudinal position on shaft 14, may be used to set the desired blade pitch by aligning the aforesaid arrow on the set collar (shown in FIG. 2) with a desired degree of pitch established by the scale of degrees of pitch 17 marked upon the hub.

FIG. 4, in top plan view, more clearly shows the scale of degrees of pitch 17 marked on the surfaces of hub halves 8 and 9. FIG. 4 also shows slits 40 and 42 which are cut into each hub half in the longitudinal direction from one end of the hub extending inward to the longitudinal bore as shown. Bolts 10 extending through the hub halves in the axial direction, as a result of slits 40 and 42, effect a snug clamping action upon blade stub shafts 14 and thereby prevent rotation of the blades in the hub once clamped therein. Bolt holes for bolts 10 are not shown in FIG. 4 for clarity, but FIG. 4 should be viewed together with FIG. 3 to ascertain the full interaction of the various components.

FIG. 5, taken along line 5—5 of FIG. 2, shows optional sector gears 20 and 22 which are clamped to the stub shafts 14 by means of bolts 50. When such sector gears are employed in the hub assembly, the pitch of both blades can be adjusted by rotating a single blade. Simultaneous pitch adjustment is thus accomplished in a manner similar to that disclosed in U.S. Pat. No. 1,154,649, described hereinabove. Use of such sector gears is optional, the sector gears not being an essential part of the present invention.

FIG. 6 is a front view of the propeller stub shaft 14 and set collar 11. Shaft 14 is threaded at its base end as shown to permit securing it to the hub with nut 15. Flat surfaces are ground, filed, or machined in the blade ends of shafts 14 as shown to facilitate securing the blade root plates 6 thereto by means of bolts 16. The set collar 11 may be adjusted longitudinally as indicated by the double arrows and span distance "A". This adjustability feature is a key element of this invention. Increasing or decreasing the diameter of the propeller significantly affects engine power utilization proportionally. Having adjustable blade length permits one to fine tune (balance) the performance of the propeller. Set collar 11, once the longitudinal span is selected, is secured to shaft 14 by tightening set screw 12, thereby tightening the collar 11 snugly onto shaft 14 and compressing (closing) gap 60 which is cut into collar 11.

FIG. 7 is a side view of shaft 14 and collar 11. This figure more clearly shows the flat sides of the blade ends of shafts 14 which receive the blade root plates 6. Also shown in this figure is indexing arrow 13 marked on collar 11 which, together with rotational degree marks 17, may be used to set the exact desired amount of pitch in each propeller blade.

FIG. 8 is a sectional view taken along line 7—7 of FIG. 7, and shows in end section shaft 14, collar 11, set screw 12 and split 60 cut through collar 11 to permit snugging the collar to the shaft.

To install the propeller assembly of this invention, the span is first adjusted by placing the entire assembly, with bolts hand tight, on level, parallel knife edges—each blade assembly being first made of equal weight. The span length (balance) of the propeller is set by moving collar 11 on one blade shaft to the desired position, locking the collar thereat with lock bolt 12 and repeating this procedure with the second blade, locking the second collar 11 on its shaft at the position of balance of the assembly upon the knife edges.

Once the propeller span is set, the pitch of both blades can be set, for example, using a carpenter's needle type plumb bob. Once the desired pitch is set, the collars 11 can be realigned so that index arrow 13 on both aligns with the identical degree index 17 for both props. In this way, the props can be removed and reinstalled at the exact same pitch, without the need for repeating the laborious, extensive testing required to initially set the proper pitch.

The pitch adjustment for both blades may be performed manually or, optionally, the sector gears 20 and 22 may be used to effect simultaneous and corresponding rotation of both props while adjusting the pitch of a single prop.

Once the desired span and pitch have been selected, collars 11 are securely tightened to shafts 14, and bolts 10 in the ends of the hub halves 8 and 9 are tightened securely, thereby locking in the desired pitch. This assembly is then installed on the drive shaft in the airplane. The assembly may be placed in the proper axial position on the drive shaft to clear any obstructions, and the large retention nuts 15 are then tightened, thereby securely and permanently clamping the propeller assembly to the drive shaft of the aircraft. Lock nuts (not shown) may be installed on shafts 14 to further secure nuts 15 and the entire assembly.

If the propeller assembly has to be removed for readjustment or repair, it will be seen that such removal is readily accomplished owing to the split hub. The entire assembly can be removed by removing nuts 15. No fore or aft bearings or other components need to be removed or disturbed. This is a significant advantage in the propeller assembly of this invention.

Other advantages include precise, preadjusted pitch upon reassembly, extra secure clamping of the hub onto the main drive shaft as a result of the split hub, change of propeller tip speed without changing RPM and precise balancing of blades is possible as discussed hereinabove.

Thus, many of the features and combinations herein described and illustrated represent substantial advances in the art of propeller assemblies, and they are deemed to be significant elements of the present invention. It is to be understood that the features and combinations involved in the appended claims are to be construed as including all proper alternatives and equivalents within the broadest possible scope of each claim in the light of the prior art.

I claim:

1. A propeller or fan assembly comprising a hub slideably positionable on an axial drive shaft and two propeller blades with root shafts passing therethrough, tangential to said drive shaft and parallel each other with their blades deployed oppositely, said hub being axially or horizontally split to permit removal of entire propeller assembly without disturbing outboard shaft bearings, said blade shafts being rotatively and longitudinally adjustable within the hub such that pitch and length may be equally set for both blades, and clamped in their respective outboard hub half and secured against their respective constraining inboard hub half by a positive retention means such as a large nut threaded to their free end such that said blade shafts serve the multiple functions of blade main structure, position adjustment mechanism, hub structure, main clamps and blade retention means.

2. The propeller assembly of claim 1, wherein means are provided on said propeller blade shafts for presetting the depth of insertion into said hub, such as set collars, such that the blades may be removed from the hub, serviced, and returned, maintaining their original overall preset diameter.

3. The propeller assembly of claim 1, wherein means are provided for synchronous rotation of the propeller shafts within the hub, such that a pitch change in one blade will be precisely transmitted into the opposing blade, such as with intermeshing toothed gear segments adjustably locked to blade shafts as illustrated.

4. The propeller assembly of claim 1, wherein a scale of degrees of rotation is marked on the propeller hub, around each propeller shaft bore on the blade side, and an index mark placed upon each propeller shaft or set collar, thereby providing means of precisely adjusting degree of blade pitch.

5. A four bladed, or multiple bladed propeller composed of two or more propeller assemblies of the type described in claim 1, arranged at equal angles to one another upon a common drive shaft, their hubs being more or less adjacent.

6. A propeller or fan assembly useful for jack shaft drive systems, constructed of two propeller halves, each half consisting of one propeller blade with stub shaft and one companion hub half clamped or fixed thereupon at right angles, and having a transverse semicircular bore through said hub half, positioned in the side away from the blade for embracing a main power drive shaft, and an open throughbore parallel its blade shaft positioned equidistant on the opposite side of main semi-circular bore, such that when said propeller half is joined about a main power shaft with its equal and opposite propeller half, the free ends of the stub shafts interlock through the said shaft bores on opposite sides of the main power shaft and firmly secure the assembled propeller in place by positive retention means such as large nuts threaded upon their exposed ends, and form a complete integral and rigid propeller unit, easily removable without disturbing blade pitch relationships, overall diameter, or outboard bearings of main power shaft.

7. The propeller assembly of claim 6, wherein the blade shafts are rotatively and longitudinally adjustable and fixable by clamping means incorporated in their respective hub halves.

8. The propeller assembly of claim 6, wherein means are provided on said propeller blade shafts for presetting the depth of insertion into said hub, such as set collars, such that the blades may be removed from the hub, serviced, and returned, maintaining their original overall preset diameter.

9. The propeller assembly of claim 6, wherein means are provided for synchronous rotation of the propeller shafts within the hub, such that a pitch change in one hub will be precisely transmitted into the opposing blade, such as with intermeshing toothed gear segments adjustably locked to blade shafts as illustrated.

10. The propeller assembly of claim 6, wherein a scale of degrees of rotation is marked on the propeller hub, around each propeller shaft or set collar, thereby providing means of precisely adjusting degree of blade pitch.

11. A four bladed, or multiple bladed propeller composed of two or more propeller assemblies of the type described in claim 6, arranged at equal angles to one another upon a common drive shaft, their hubs being more or less adjacent.

12. A propeller or fan assembly consisting of two rectangular hub halves deployed transversely on opposite sides of the main power driven shaft with a main bore centered longitudinally on their abutting faces so as to permit their snug clamping upon said power shaft, and two blade assemblies with stub shafts drawn oppositely through bores in the lateral extremeties of said hub halves, said stub shafts being first fixed or clamped into their respective hub halves on their blade side of main power shaft, and their free ends extending through the open bore of the opposing hub half and locked thereat by positive retention means such as a large nut, thus forming a strong quadrangle of cooperating cantilever and tension elements about the drive shaft and holding the entire propeller in rigid deployment once positioned upon power shaft.

13. The propeller assembly of claim 12, wherein the blade shafts are rotatively and longitudinally adjustable and fixable within their respective hub half by clamping or similar means, thus allowing for setting of pitch and overall propeller diameter.

14. The propeller assembly of claim 12, wherein means are provided on said propeller blade shafts for presetting the depth of insertion into said hub, such as set collars, such that the blades may be removed from the hub, serviced, and returned, maintaining their original overall preset diameter.

15. The propeller assembly of claim 12, wherein means are provided for synchronous rotation of the propeller shafts within the hub, such that a pitch change in one hub will be precisely transmitted into the opposing blade, such as with intermeshing toothed gear segments adjustably locked to blade shafts as illustrated.

16. The propeller assembly of claim 12, wherein a scale of degrees of rotation is marked on the propeller hub, around each propeller shaft or set collar, thereby providing means of precisely adjusting degree of blade pitch.

17. A four bladed, or multiple bladed propeller composed of two or more propeller assemblies of the type described in claim 12, arranged at equal angles to one another upon a common drive shaft, their hubs being more or less adjacent.

* * * * *